United States Patent
Larsson et al.

(10) Patent No.: US 9,106,801 B2
(45) Date of Patent: Aug. 11, 2015

(54) TERMINALS, SERVERS, AND METHODS THAT FIND A MEDIA SERVER TO REPLACE A SENSED BROADCAST PROGRAM/MOVIE

(75) Inventors: Bo Hakan Larsson, Malmö (SE); Henrik Sven Bengtsson, Lund (SE); Björn Martin Gunnar Lindquist, Bjärred (SE); Mans Folke Markus Andreasson, Lund (SE); Per Emil Åstrand, Lund (SE); Olivier Thierry Nicolas Moliner, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1520 days.

(21) Appl. No.: 12/109,667

(22) Filed: Apr. 25, 2008

(65) Prior Publication Data
US 2009/0271829 A1     Oct. 29, 2009

(51) Int. Cl.
*H04N 7/18* (2006.01)
*H04N 7/173* (2011.01)
(Continued)

(52) U.S. Cl.
CPC .......... *H04N 7/17318* (2013.01); *H04H 60/58* (2013.01); *H04H 60/59* (2013.01);
(Continued)

(58) Field of Classification Search
USPC ............ 725/74–85, 106–120, 131–134, 725/139–142, 151–153; 348/734
See application file for complete search history.

(56) References Cited

U.S. PATENT DOCUMENTS

| 6,567,984 B1 * | 5/2003 | Allport ................... 725/110 |
| 7,064,675 B2 * | 6/2006 | Zigmond et al. ........ 340/12.53 |

(Continued)

FOREIGN PATENT DOCUMENTS

| WO | WO 02/11123 A2 | 2/2002 |
| WO | WO 02/28036 A1 | 4/2002 |
| WO | WO 2005/079499 A2 | 9/2005 |

OTHER PUBLICATIONS

Anonymous. Gracenote: Mobile MusicID[online]. Feb. 1, 2008:3 pages. Retrieved on May 6, 2009.
(Continued)

*Primary Examiner* — Annan Shang
(74) *Attorney, Agent, or Firm* — Myers Bigel Sibley & Sajovec, PA (57) ABSTRACT

A wireless mobile terminal works with an identification server to automatically identify a broadcast program/movie and then identify and connect to a networked media server to receive the identified program/movie therefrom. The terminal generates data that characterizes content of a broadcast program/movie that is send by the terminal and is playing external thereto. The terminal transmits a message that includes the characterization data and a request for identification of a media server from which the broadcast program/movie can be received. The identification server identifies the broadcast program/movie, and identifies a user viewed location within the identified program/movie that corresponds to what was sensed by the terminal. The identification server identifies an Internet address of a media server from which the terminal can receive transmission of the identified program/movie. The identification server transmits a message to the terminal that identifies the identified program/movie, the user viewed location therein, and the Internet address of the media server. The terminal responds to the message by establishing a communication connection to the identified media server and requesting transmission therefrom of the identified program/movie starting from a location corresponding to the user viewed location.

20 Claims, 3 Drawing Sheets

(51) Int. Cl.

| | |
|---|---|
| *H04H 60/58* | (2008.01) |
| *H04H 60/59* | (2008.01) |
| *H04H 60/85* | (2008.01) |
| *H04M 1/725* | (2006.01) |
| *H04N 21/218* | (2011.01) |
| *H04N 21/254* | (2011.01) |
| *H04N 21/414* | (2011.01) |
| *H04N 21/422* | (2011.01) |
| *H04N 21/4223* | (2011.01) |
| *H04N 21/439* | (2011.01) |
| *H04N 21/44* | (2011.01) |
| *H04L 29/08* | (2006.01) |
| *H04L 29/06* | (2006.01) |

(52) U.S. Cl.
CPC .............. *H04H 60/85* (2013.01); *H04L 67/20* (2013.01); *H04M 1/72516* (2013.01); *H04N 21/2181* (2013.01); *H04N 21/254* (2013.01); *H04N 21/41407* (2013.01); *H04N 21/4223* (2013.01); *H04N 21/42203* (2013.01); *H04N 21/4394* (2013.01); *H04N 21/44008* (2013.01); *H04L 65/4084* (2013.01)

(56) References Cited

U.S. PATENT DOCUMENTS

| | | | |
|---|---|---|---|
| 7,760,907 B2 * | 7/2010 | Haughawout et al. | 382/100 |
| 7,773,870 B2 * | 8/2010 | Naruse | 396/15 |
| 8,032,409 B1 * | 10/2011 | Mikurak | 705/14.39 |
| 2002/0107737 A1 * | 8/2002 | Kaneko et al. | 705/14 |
| 2003/0196209 A1 * | 10/2003 | Lee et al. | 725/122 |
| 2005/0028208 A1 * | 2/2005 | Ellis et al. | 725/58 |
| 2006/0077959 A1 * | 4/2006 | Beckemeyer | 370/352 |
| 2007/0124775 A1 | 5/2007 | DaCosta | |
| 2008/0062337 A1 * | 3/2008 | Maier | 348/734 |
| 2008/0082510 A1 | 4/2008 | Wang et al. | |
| 2008/0134255 A1 * | 6/2008 | Ferris et al. | 725/62 |
| 2008/0231760 A1 * | 9/2008 | Kibble | 348/734 |
| 2009/0005010 A1 * | 1/2009 | Dote et al. | 455/412.1 |
| 2009/0019061 A1 * | 1/2009 | Scannell, Jr. | 707/10 |

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/IB2008/054427, May 28, 2009.

European Office Action Corresponding to European Patent Application No. 08874013.9-1908; Date of Issue: Oct. 15, 2013; 10 Pages.

* cited by examiner

TERMINALS, SERVERS, AND METHODS THAT FIND A MEDIA SERVER TO REPLACE A SENSED BROADCAST PROGRAM/MOVIE

BACKGROUND OF THE INVENTION

The present invention relates to the field of wireless communications in general and, more particularly, to viewing broadcast programs and movies on wireless communication terminals.

A wide variety of forms of delivery of broadcast programs and movies have emerged. For example, it is now commonplace for programs and movies to be available from over-the-air terrestrial and satellite television service providers and Internet-based television providers. Programs and movies including, without limitation, televised shows, movies, news, music, and other content may be simultaneously broadcast over a wide geographic region and/or may be broadcast on-demand to a particular receiver. Moreover, broadcast programs/movies are available on transportable medium, including Digital Video Disks (DVD), HD-DVD, and Blu-Ray DVD.

Wireless mobile terminals, such as cellular phones, are increasingly being provided with capabilities to receive broadcast programs and movies from network servers. Such content is becoming increasing available as more mobile terminals support high-bandwidth communication technologies, such as Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). Users may now search the Internet to find media servers from which broadcast programs and movies can be downloaded as streaming audio/video, such as using the Real Time Streaming Protocol (RTSP) and/or other protocols.

Although advancements in mobile terminal features and communications technologies are providing far more users the capability to obtain broadcast programs and movies through their mobile terminals, these capabilities may continue to be slowly adopted due to, for example, the complexity and time required for users to search for, connect to, and download such content through their mobile terminals.

SUMMARY OF THE INVENTION

Various embodiments of the present invention provide a wireless mobile terminal that works with an identification server to automatically identify a sensed broadcast program/movie, and then to identify and connect to a networked media server to receive the identified program/movie therefrom. A person who is watching and/or listening to a broadcast program/movie can thereby continue to watch that program/movie by having it automatically transferred onto the person's wireless mobile terminal for viewing as the person travels. Playback of the program/movie on the wireless mobile terminal may be controlled to automatically start from where the person was last viewing the broadcast program/movie.

In some embodiments, a wireless mobile terminal includes a radio frequency (RF) transceiver, a microphone/camera sensor, and a controller. The RF transceiver is configured to communicate via a wireless communication network with a broadcast program/movie identification server and with a program/movie media server. The microphone/camera sensor is configured to sense a broadcast program/movie that is playing external to the mobile terminal. The controller is configured to generate characterization data that characterizes content of the broadcast program/movie sensed by the sensor, to transmit via the RF transceiver to the identification server a message that includes the characterization data and a request for identification of the broadcast program/movie and identification of a media server that can supply the identified program/movie, and to respond to a message from the identification server that identifies a media server that can supply the identified program/movie by establishing a communication connection via the RF transceiver to the identified media server and requesting transmission therefrom of the identified program/movie.

In some further embodiments, the microphone/camera sensor includes a microphone, and the controller is further configured to include in the characterization data transmitted to the identification server a recording of an audio portion of the broadcast program/movie sensed by the microphone.

In some further embodiments, the microphone/camera sensor includes a microphone, and the controller is further configured to generate spectral data that characterizes a spectral pattern of digital samples of an audio portion of the broadcast program/movie sensed by the microphone, and to include the spectral data in the characterization data transmitted to the identification server.

In some further embodiments, the microphone/camera sensor includes a camera, and the controller is further configured to include in the characterization data transmitted to the identification server a recording of a video portion of the broadcast program/movie that is sensed by the camera.

In some further embodiments, the controller is further configured to respond to the message from the identification server containing information identifying the broadcast program/movie and containing an Internet address of the media server from which the identified program/movie can be downloaded by the terminal by establishing a communication connection to the identified Internet address of the media server and downloading therefrom the identified program/movie.

In some further embodiments, the controller is further configured to respond to the message from the identification server identifying a user viewed location within the identified program/movie by transmitting a command to the media server that requests downloading therefrom of the identified program/movie starting from a location corresponding to the identified user viewed location.

In some further embodiments, the controller is further configured to initiate generation of the characterization data, which characterizes content of the broadcast program/movie sensed by the sensor, in response to determining that strength of a sensed audio portion of the broadcast program/movie has decreased over time below a threshold level.

In some further embodiments, the controller is further configured to initiate generation of the characterization data, which characterizes content of the broadcast program/movie sensed by the sensor, in response to determining that strength of short range wireless network communication signals from a wireless communication device has decreased over time below a threshold level.

Some other embodiments are directed to a broadcast program/movie identification server that includes a network interface and a controller. The network interface is configured to communicate via a communication network with a wireless mobile terminal. The controller is configured to receive a message from the terminal that requests identification of a replacement program/movie server, the message including characterization data that characterizes content of a broadcast program/movie that is playing external to and is sensed by the terminal, and is configured to identify the broadcast program/movie in response to the characterization data, to further identify a media server from which the terminal can receive transmission of the identified program/movie, and to transmit a message to the terminal that identifies the media server.

In some further embodiments, the identification server further includes a repository that contains names of known programs/movies and associated predefined data that characterizes content of the known programs/movies, and that identifies known media servers from which the known programs/movies can be downloaded by the terminal. The controller is further configured to identify the broadcast program/movie sensed by the terminal by searching the repository to find a match between the characterization data received from the terminal and the predefined data characterizing content of one of the known programs/movies.

In some further embodiments, the controller is further configured to identify the broadcast program/movie sensed by the terminal by searching the predefined data in the repository to find a match between an audio recording with the received message of an audio portion of the broadcast program/movie sensed by the terminal and the predefined data characterizing content of one of the known programs/movies.

In some further embodiments, the controller is further configured to identify the broadcast program/movie sensed by the terminal by matching a pattern of the recorded audio portion to a pattern of a portion of an audio track of one of the known programs/movies.

In some further embodiments, the controller is further configured to identify the broadcast program/movie sensed by the terminal by searching the predefined data in the repository to find a match between a video recording with the received message of a video portion of the broadcast program/movie sensed by the terminal and the predefined data characterizing content of one of the known programs/movies In some further embodiments, the controller is further configured to identify the broadcast program/movie sensed by the terminal by at least initially limiting the searching in the repository to programs/movies that are known to be recently broadcasted by TV service providers.

In some further embodiments, the controller is further configured to search the repository to identify an Internet address of a known media server from which the identified program/movie can be downloaded by the terminal, and to transmit the identified Internet address to the terminal.

In some further embodiments, the controller is further configured to identify a user viewed location within the identified program/movie that corresponds to what was sensed by the terminal, and to transmit the user viewed location to the terminal.

In some further embodiments, the identified user viewed location identifies an elapsed completed play time relative to a beginning of the identified program/movie.

In some further embodiments, the controller is further configured to identify the user viewed location in response to a time of day stamp associated with the message and a known play timeline of the identified program/movie.

In some further embodiments, the controller is further configured to identify the user viewed location in response to a location where a match was identified between the characterization data received from the terminal and the predefined data in the repository characterizing content of the identified program/movie.

In some other embodiments, a method of operating a wireless mobile terminal and an identification server includes sensing a broadcast program/movie at the wireless mobile terminal that is playing external to the terminal. Characterization data is generated at the terminal which characterizes content of the sensed broadcast program/movie. A message is transmitted from the terminal which includes the characterization data and a request for identification of a media server from which the broadcast program/movie can be received. The identification server identifies the broadcast program/movie by searching a repository to find a match between the characterization data received from the terminal and predefined data that characterizes content of a plurality of known programs/movies. The identification server identifies a user viewed location within the identified program/movie that corresponds to what was sensed by the terminal. The identification server identifies an Internet address of a media server from which the terminal can receive transmission of the identified program/movie. The identification server transmits a message to the terminal that identifies the identified program/movie, the user viewed location within the identified program/movie, and the Internet address of the media server. The terminal responds to the message received from the identification server by establishing a communication connection to the Internet address of the identified media server and requesting transmission therefrom of the identified program/movie starting from a location corresponding to the user viewed location.

Other apparatus, systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

As used herein, a "wireless mobile terminal" or, abbreviated, "terminal" includes, but is not limited to, any electronic device that is configured to transmit/receive communication signals via a long range wireless interface such as, for example, a cellular interface, via a short range wireless interface such as, for example, a Bluetooth wireless interface, a wireless local area network (WLAN) interface such as IEEE 801.11a-g, and/or via another radio frequency (RF) interface. Example terminals include, but are not limited to, cellular phones, PDAs, and mobile computers that are configured to communicate with other communication devices via a cellular communication network, a Bluetooth communication network, WLAN communication network, and/or another RF communication network.

Figure 1:
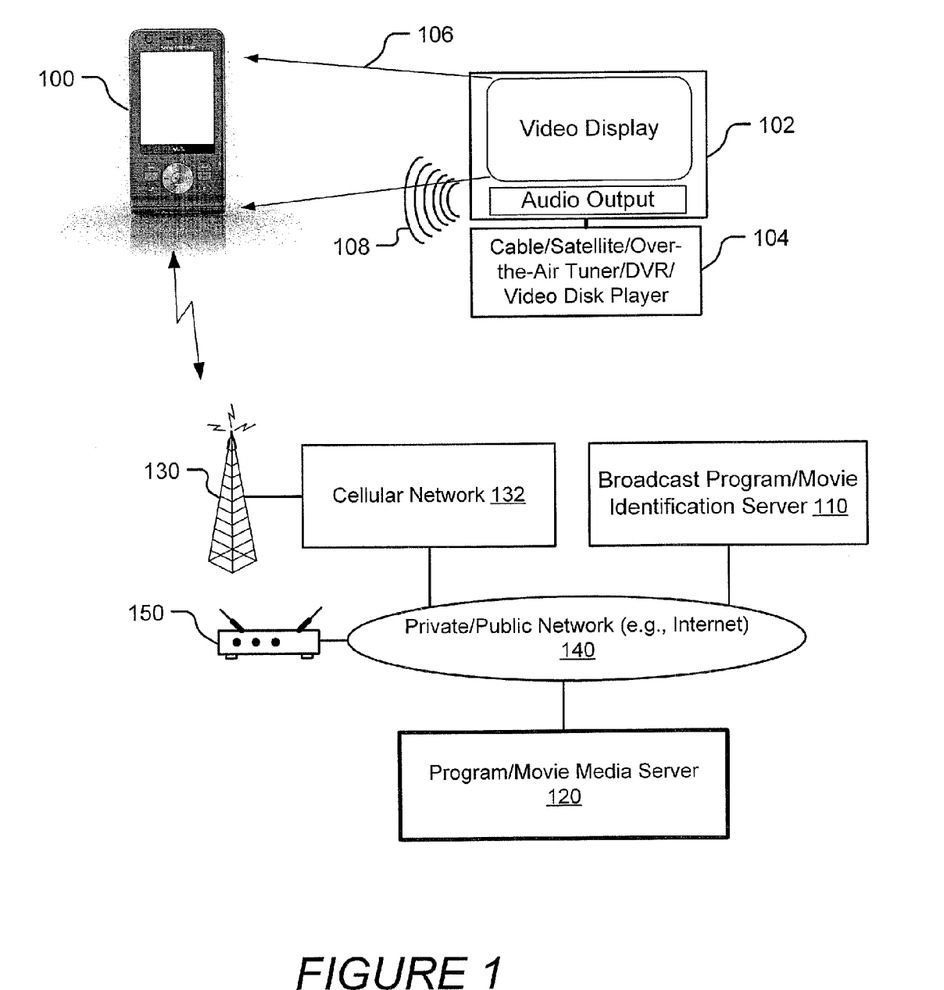
FIG. 1 is a system diagram that illustrates a wireless mobile communication terminal that senses a broadcast program/movie that is playing external to the mobile terminal, that communicates associated characterization data to a broadcast program/movie stream identification server, and that connects to an identified program/movie media server in accordance with some embodiments of the present invention.

Various embodiments of the present invention are directed to enabling a person who is watching and/or listening to a broadcast program/movie to continue to watch that program/movie by having it automatically transferred onto the person's wireless mobile terminal for viewing as the person travels. FIG. 1 is a system diagram that illustrates a terminal 100 that senses a broadcast program/movie that is playing external to the terminal 100, that communicates data characterizing the broadcast program/movie to a broadcast program/movie stream identification server 110, and that responds to commands therefrom by connecting to a networked program/movie media server 120 to obtain a replacement broadcast program/movie stream therefrom in accordance with some embodiments of the present invention.

Accordingly, the terminal 100, working with the identification server, can automatically identify a sensed broadcast program/movie and can then identify and connect to a networked media server to receive the identified program/movie therefrom. Moreover, the replacement program/movie can be controlled to automatically start playing from a location corresponding to about where the person was last viewing the broadcast program/movie.

Referring to FIG. 1, an exemplary television 102 is playing a broadcast program/movie which may be received through a cable television tuner, a satellite television tuner, an over-the-air television tuner, a digital video recorder (DVR), and/or video disc player (e.g., DVD, HD-DVD, and/or Blu-Ray disk) 104. The broadcast program/movie may include audio only (e.g., music channel), video only, or a combination of audio and video such as typically included in broadcast television programs and movies. The program/movie may be presently broadcast across a geographic area (e.g., cable/satellite/over-the-air service area), broadcast on-demand to a particular subscriber, or contained on transportable media (e.g., video disk).

The terminal 100 is configured to use a microphone to sense the audio signals 108 generated by the television 102 and/or to use a camera to sense the video images 106 generated by the television 102. The terminal 100 is further configured to generate characterization data that characterizes content of the sensed broadcast program/movie. In some embodiments, the terminal 100 is configured to record a portion of the sensed audio signals 108 into a memory, and to include the recording in the characterization data. The terminal 100 may alternatively or additionally generate spectral data that characterizes a spectral pattern of digital samples of the audio portion of the broadcast program/movie, and may include the spectral data in the characterization data. The spectral data may, for example, characterize the frequency and/or amplitude pattern of the sampled audio portion of the broadcast program/movie. In some other embodiments, the terminal 100 is configured to record a portion of the sensed video images 106 into the memory, and to include the recording in the characterization data.

In order to identify the sensed broadcast program/movie and to identify a media server from which the terminal 100 can receive transmission of the identified program/movie, the terminal 100 transmits a message that includes the characterization data and an associated request for identification of the broadcast program/movie and for identification of a replacement media server to the identification server 110. The terminal 100 may communicate the message to the identification server 110 through a wireless communication link with a cellular base station transceiver 130, and then through an associated cellular network 132 (e.g., mobile switching office) and a private/public network (e.g., Internet) 140. Alternatively or additionally, the terminal 100 may communicate the message to the identification server 110 through a wireless communication link with a Wireless Local Area Network (WLAN) router 150 and then through the private/public network 140.

The identification server 110 receives the message from the terminal 100 and identifies the broadcast program/movie responsive to the characterization data, and it further identifies the media server 120 as being an audio/video (A/V) source that can transmit the identified program/movie to the terminal 100. The identification server 110 transmits a response message to the terminal 100 that identifies the program/movie and the media server 120 (e.g., such as via an Internet address or other resource identifier). The response message may be communicated through the private/public network 140 and the cellular network 132 and cellular base station transceiver 130, and/or through the private/public network 140 and the WLAN router 150 to the terminal 100.

The terminal 100 responds to the response message by establishing a communication connection to the media server 120, such as through the wireless communication link with the cellular base station transceiver 130 and/or with the WLAN router 150. The terminal 100 sends a message to the media server 120 requesting transmission of the identified program/movie therefrom. In some embodiments, the media server 120 can stream the identified program/movie to the wireless terminal 100, such as using the Real Time Streaming Protocol (RTSP) IETF RFC 2326 and/or RFC 3550, through the exemplary wireless communication link with the cellular base station transceiver 130 and/or the WLAN router 150. Moreover, the media server 120 may start the streaming program/movie from a location that is identified in the message from the terminal 100 as corresponding to where the user last viewed the broadcast program/movie. Accordingly, playback of the streaming program/movie on the terminal 100 may begin from a point where the user was last watching the broadcast of the same program/movie.

These and other exemplary operations and embodiments of the wireless terminal 100, the identification server 110, and the media server 120 are further described below with regard to FIGS. 2-4.

Figure 2:
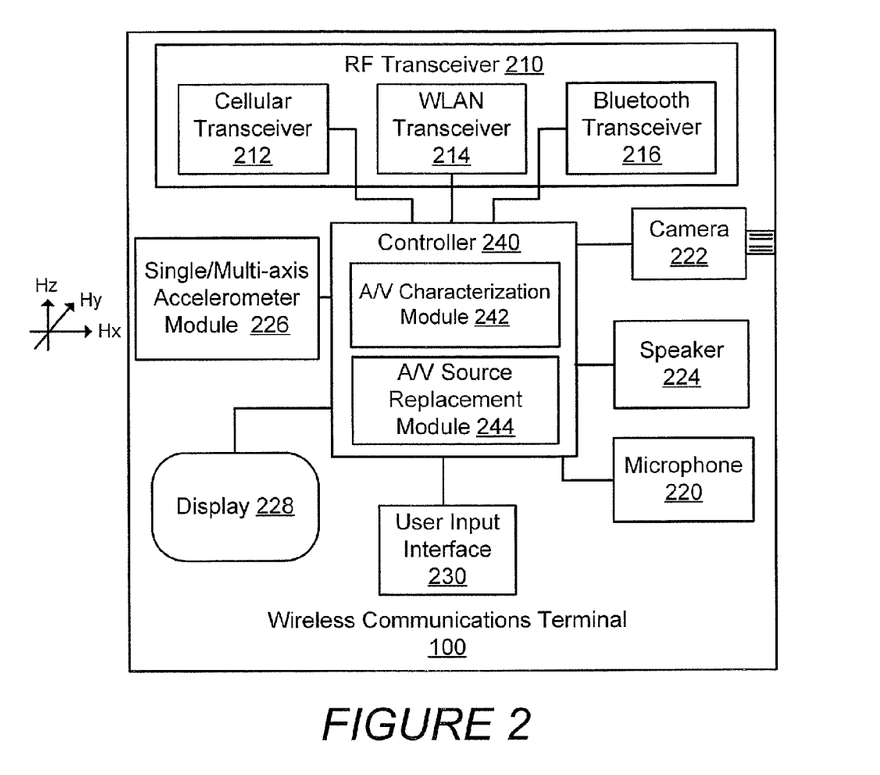
FIG. 2 is a block diagram of the mobile terminal of FIG. 1 in accordance with some embodiments of the present invention.

FIG. 2 is a block diagram of the mobile terminal 100 of FIG. 1 in accordance with some embodiments of the present invention. FIG. 4 is a flowchart and data flow diagram showing exemplary operations 400 and methods of the mobile terminal 100 and the identification server 110 in accordance with some embodiments of the invention.

Figure 4:
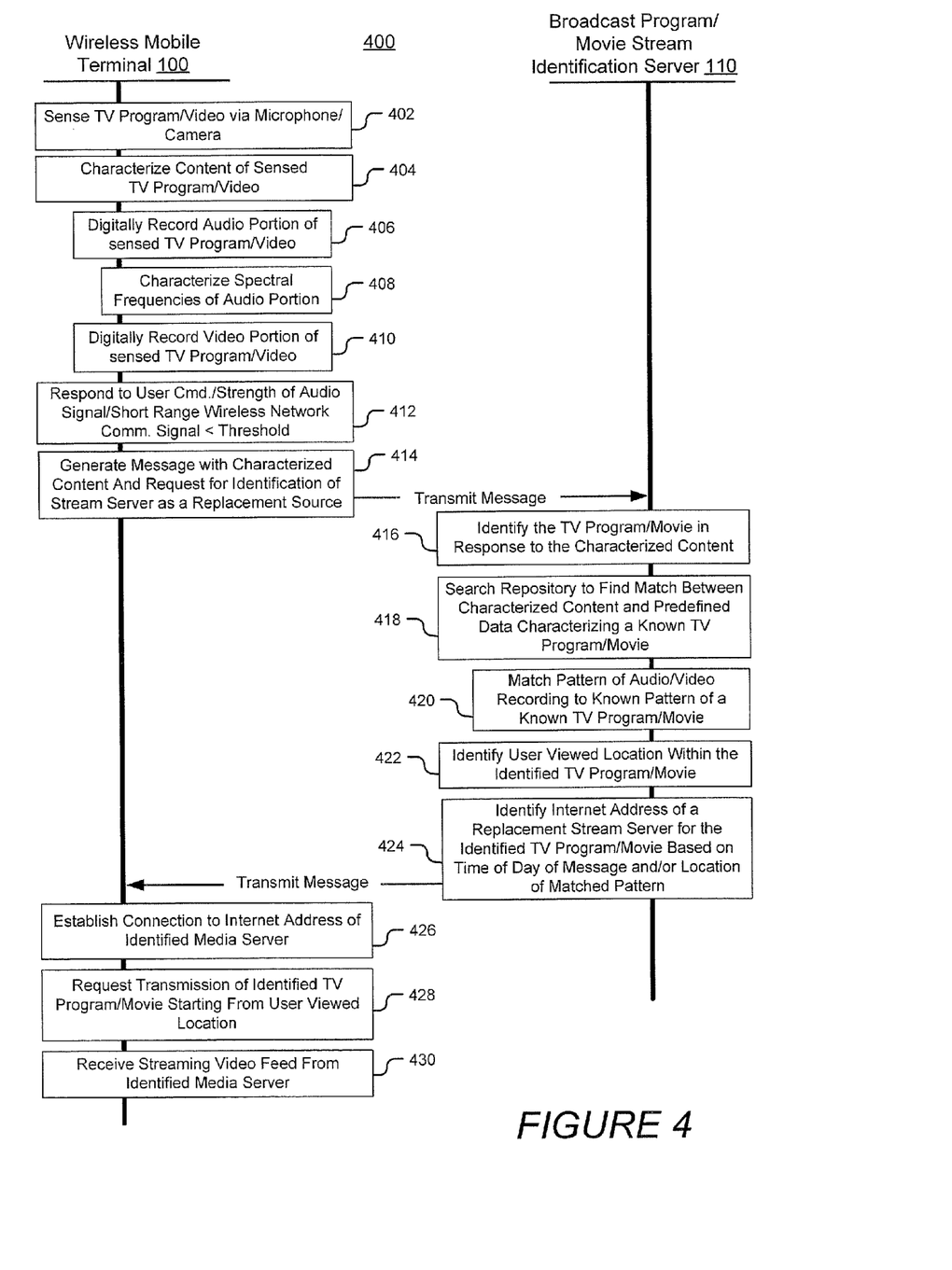
FIG. 4 is a flowchart and data flow diagram showing exemplary operations and methods of the mobile terminal and broadcast program/movie stream identification server of FIG. 1 in accordance with some embodiments of the invention.

Referring to FIGS. 2 and 4, the terminal 100 can include a wireless RF transceiver 210, a microphone 220, a camera 222, a speaker 224, a single/multi-axis accelerometer module 226, a display 228, a user input interface 230 (e.g., keypad/keyboard/touch interface/user selectable buttons), and a controller 240.

The microphone 220 generates a microphone signal that is indicative of the incident audio signals 108 from the broadcast program/movie (operation 402, FIG. 4). The camera 222 generates a video signal that is indicative of the incident video images 106 from the broadcast program/movie (operation 402, FIG. 4). An A/V characterization module 242 of controller 240 generates characterization data that characterizes content of the sensed audio signals 108 and/or the video images 106 (operation 404, FIG. 4). The A/V characterization module 242 may be configured to record a portion of the sensed audio signals 108 (operation 406, FIG. 4) into a memory (e.g., that is within or separate from the controller 240), and to include the recording in the characterization data. The A/V characterization module 242 may alternatively or additionally generate spectral data that characterizes a spectral pattern of digital samples of the sensed audio signals 108, and may include the spectral data in the characterization data (operation 408, FIG. 4). The A/V characterization module 242 may alternatively or additionally record a portion of the sensed video images 106 into the memory, and include the recording in the characterization data (operation 410, FIG. 4).

Terminal 100 can automatically initiate identification and downloading of the broadcast program/movie from the media server 102 in response to determining that it has moved sufficiently far away from the source (e.g. television) of the broadcast program/movie (operation 412, FIG. 4). In some embodiments, an A/V source replacement module 244 within the controller 240 can initiate the identification and download process in response to the strength (e.g., amplitude) of the sensed audio signal 108 decreasing below a threshold value, in response to strength of a received short range RF communication signal (e.g., received WLAN signals and/or Bluetooth signal) decreasing below a threshold value, and/or in response to a user command via the user input interface 230.

As shown in FIG. 4, the terminal 100 may continuously record/characterize the audio signals 108/video images 106 into a circular buffer memory for later use in identifying the sensed broadcast program/movie. By continuously recording/characterizing the sensed audio/video, the terminal 100 may thereby obtain a better sample of the broadcast program/movie that may otherwise be obtained if the terminal 100 were to wait to obtain such samples until it has been moved more distant from the source of the broadcast program/movie (e.g., television).

In response to sensing that the terminal 100 has moved a sufficient distance away from the source of broadcast program/movie and/or in response to a user command, the A/V source replacement module 244 generates a message that includes the characterization data and an associated request for identification of the broadcast program/movie and the replacement media server (operation 414, FIG. 4). The A/V source replacement module 244 transmits the message to the identification server 110 via the RF transceiver 210.

In the exemplary embodiment of FIG. 2, the RF transceiver 210 can include a cellular transceiver 212, a WLAN transceiver 214 (e.g., compliant with one or more of the IEEE 801.11a-g standards), and/or a Bluetooth transceiver 216. The cellular transceiver 116 can be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

Accordingly, the terminal 100 can communicate with the identification server 110 and the media server 120 via a short range wireless communication interface through the WLAN transceiver 214 and the WLAN router 150 and/or through the Bluetooth transceiver 216 and a Bluetooth network interface such as within the WLAN router 150 and/or another device connected to the private/public network 140. The terminal 100 may additionally or alternatively communicate with the identification server 110 and the media server 120 via a long range wireless communication interface through the cellular transceiver 212 and the cellular base station transceiver 130.

It is to be understood that although the exemplary terminal 100 has been illustrated in FIG. 2 with various separately defined elements for ease of illustration and discussion, the invention is not limited thereto. Instead, various functionality described herein in separate functional elements may be combined within a single functional element and, vice versa, functionally described herein in single functional elements can be carried out by a plurality of separate functional elements.

Figure 3:
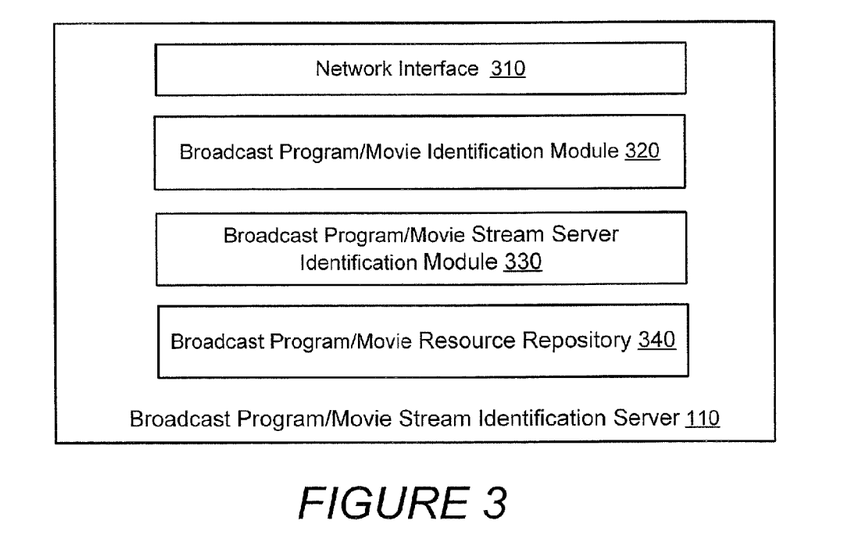
FIG. 3 is a block diagram of the broadcast program/mobile stream identification server of FIG. 1 in accordance with some embodiments of the present invention.

An exemplary embodiment of the identification server 110 is shown in the block diagram of FIG. 3 in accordance with some embodiments of the present invention. Referring to FIG. 3, the identification server 110 can include a network interface 310, a broadcast program/movie identification module 320, a broadcast program/movie stream server identification module 330, and a broadcast program/movie resource repository 340, some or all of which may be included within one or more controllers.

The repository 340 can include a database that contains names of known programs/movies and associated predefined data that characterizes the content of the known programs/movies, and which further identifies known media servers from which the known programs/movies can be downloaded by the terminal. In some embodiments, the repository 340 stores lists of programs/movies, and stores at least a substantially complete recording of the audio track and/or video track of each of the listed programs/movies and/or stores other data that characterizes the content of each of the listed programs/movies.

The identification module 320 is configured to identify the broadcast program/movie characterized in the terminal's message by searching the repository to find a match between the characterization data received in the message and the predefined data characterizing content of one of the known programs/movies in the repository 340 (operations 416-418, FIG. 4). In some embodiments, the identification module 320 identifies, within the message received from the terminal 100, an audio recording of a portion of the audio signal 108 sensed by the terminal 100, and searches among the audio tracks of each of the known programs/movies in the repository 340 to find a match to a pattern within the audio track one of the known programs/movies (operation 420, FIG. 4). In some alternative or additional embodiments, the identification module 320 identifies within the message a video recording of a portion of the video images 106 sensed by the terminal 100, and searches among the video tracks of each of the known programs/movies in the repository 340 to find a match to a pattern within the video track of one of the known programs/movies (operation 420, FIG. 4).

Thus, for example, the identification module 320 may search the audio and/or video tracks to find a match between the pattern of the recorded audio and/or video contained in the message from the terminal 100 and a corresponding portion of one of the tracks in the repository 340, and/or may search to find a match between the spectral data or other data that characterizes the sensed audio and/or video and the predefined data in the repository 340.

The speed of the search may be significantly increased by the identification module 320 at least initially limiting the searching of the repository 340 to program/movies that are known to be recently broadcasted by television service providers. For example, in response to receiving a message from the terminal 100, the identification module 320 may query a television guide database using the present time and date to identify the television programs/movies that are presently being broadcast by over-the-air television service providers, cable television service providers, and/or satellite television service providers. The identification module 320 can then limit its initial searching to the predefined data (e.g. audio tracks and/or video tracks) of programs/movies that are identified as being presently broadcasted and, if no match is found, it can then broaden its search outside of those presently broadcasted programs/movies.

The identification module 320 can be configured to identify a user viewed location within the identified program/movie that corresponds to what was sensed by the terminal 100 (operation 422, FIG. 4). Thus, for example, when the terminal 100 sensed a portion of the broadcast program/movie that occurs one-third through the identified program/movie playback timeline, the identification module 320 can identify that location based on a time of day stamp associated with the message, such as when the message was received from the terminal 100 and/or when it was transmitted, and a known playback timeline of the identified program/movie. For a presently broadcasted program/movie, the identification module 320 may correlate the time of day of the received message to the viewed location in the program/movie by querying a television guide which lists the starting broadcast time of the identified program/movie.

When the terminal senses a pre-recorded program/movie, such as one being played from a digital video recorder and/or a digital video disk, the identification module 320 may not be able to use the television guide to correlate the message time of day to the viewed location. The identification module 320 may alternatively or additionally be configured to identify the user viewed location based on a location within the predefined data of the repository 340 where a match was identified to the characterization data received from the terminal 100. Accordingly, when the recorded audio in the message from the terminal 100 matches the audio track of the identified program/movie at a location corresponding to one third of the way through the identified program/movie playback timeline, the identification module 320 can determine that the user has viewed one third of the identified program/movie.

The stream server identification module 330 searches the repository 340 to identify an Internet address or other resource identifier (e.g., RTSP URL) for a known media server from which the identified program/movie can be downloaded by the terminal 100 (operation 424, FIG. 4). In the example of FIG. 1, the stream server identification module 330 identifies from the repository 340 that the media server 120 contains the identified program/movie and that the terminal 100 can be directed thereto to download the identified program/movie therefrom. The stream server identification module 330 generates a response message that identifies the identified program/movie, the user viewed location within the identified program/movie, and the Internet address or other resource identifier (e.g., RTSP URL) for the media server 120. The response message may be formatted based on the RTSP IETF RFC 2326 and/or RFC 3550 protocol. The stream server identification module 330 transmits the response message through the network interface 310 and a wireless communication link, such as described above, to the terminal 100.

Accordingly, the response message can inform the terminal 100 of not only the identity of the program/movie it sensed, but may also inform it of the user's viewed location within the identified program/movie play timeline and inform it of what media server it can connect to request transmission of the identified program/movie.

The terminal 100 can respond to the message from the authentication server 110 by establishing a communication connection to the identified Internet address of the media server 120 (operation 426, FIG. 4). The terminal 100 can transmit a message to the media server 120 that requests that the media server 120 transmit, such as by streaming video according to RTSP IETF RFC 2326 and/or RFC 3550 protocol, the identified program/movie starting from a location therein that is identified in the message from the terminal 100 as corresponding to where the user last viewed the broadcast program/movie (operations 428-430, FIG. 4).

Accordingly, the terminal 100, working with the identification server 110, can automatically identify a sensed broadcast program/movie and can then identify and connect to a networked media server to receive the identified program/movie therefrom. A person who is watching and/or listening to a broadcast program/movie can thereby continue to watch that program/movie by having it automatically transferred onto the person's wireless mobile terminal for viewing as the person travels.

As will be appreciated by one of skill in the art, the present invention may be embodied as apparatus (terminals, servers, systems), methods, and computer program products. Accordingly, the present invention may take the form of an entirely hardware embodiment, a software embodiment or an embodiment combining software and hardware aspects all generally referred to herein as a "circuit" or "module." It will be understood that each block of the flowchart illustrations and/or block diagrams, and combinations of blocks in the flowchart illustrations and/or block diagrams, described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can be recorded on a computer-readable storage medium, such as on hard disks, CD-ROMs, optical storage devices, or integrated circuit memory devices. These computer program instructions on the computer-readable storage medium direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless mobile terminal comprising:
   a radio frequency (RF) transceiver that is configured to communicate via a wireless communication network with a broadcast program/movie identification server and with a program/movie media server;
   a microphone/camera sensor that is configured to sense a broadcast program/movie that is playing external to the mobile terminal; and
   a controller that is configured to generate characterization data that characterizes content of the broadcast program/movie sensed by the sensor, to transmit via the RF transceiver to the identification server a message that includes the characterization data and a request for identification of the broadcast program/movie and a media server that can supply the identified program/movie, and to respond to a message from the identification server that identifies a media server that can supply the identified program/movie by establishing a communication connection via the RF transceiver to the identified media server and requesting transmission therefrom of the identified program/movie, the controller being further configured to initiate generation of the characterization data and receipt of the identified program/movie at the mobile terminal in response to determining that the mobile terminal has moved away from a source that is playing the broadcast program/movie.

2. The wireless mobile terminal of claim 1, wherein:
   the microphone/camera sensor comprises a microphone; and
   the controller is further configured to include in the characterization data transmitted to the identification server a recording of an audio portion of the broadcast program/movie sensed by the microphone.

3. The wireless mobile terminal of claim 1, wherein:
   the microphone/camera sensor comprises a microphone; and
   the controller is further configured to generate spectral data that characterizes a spectral pattern of digital samples of an audio portion of the broadcast program/movie sensed by the microphone, and to include the spectral data in the characterization data transmitted to the identification server.

4. The wireless mobile terminal of claim 1, wherein:
   the microphone/camera sensor comprises a camera; and
   the controller is further configured to include in the characterization data transmitted to the identification server a recording of a video portion of the broadcast program/movie that is sensed by the camera.

5. The wireless mobile terminal of claim 1, wherein:
   the controller is further configured to respond to the message from the identification server containing information identifying the broadcast program/movie and containing an Internet address of the media server from which the identified program/movie can be downloaded by the terminal by establishing a communication connection to the identified Internet address of the media server and downloading therefrom the identified program/movie.

6. The wireless mobile terminal of claim 5, wherein:
   the controller is further configured to respond to the message from the identification server identifying a user viewed location within the identified program/movie by transmitting a command to the media server that requests downloading therefrom of the identified program/movie starting from a location corresponding to the identified user viewed location.

7. The wireless mobile terminal of claim 5, wherein:
   the controller is further configured to initiate generation of the characterization data, which characterizes content of the broadcast program/movie sensed by the sensor, in response to determining that strength of a sensed audio portion of the broadcast program/movie has decreased over time below a threshold level.

8. The wireless mobile terminal of claim 5, wherein:
   the controller is further configured to initiate generation of the characterization data, which characterizes content of the broadcast program/movie sensed by the sensor, in response to determining that strength of short range wireless network communication signals from a wireless communication device has decreased over time below a threshold level.

9. A broadcast program/movie identification server comprising:
   a network interface that is configured to communicate via a communication network with a wireless mobile terminal; and
   a controller that is configured to receive a message from the terminal that requests identification of a replacement program/movie server, the message including characterization data that characterizes content of a broadcast program/movie that is playing external to and is sensed by the terminal, and the controller is configured to identify the broadcast program/movie in response to the characterization data, to further identify a media server from which the terminal can receive transmission of the identified program/movie, and to transmit a message to the terminal that identifies the media server, wherein the terminal is configured to initiate generation of the characterization data and receipt of the identified program/movie at the terminal in response to determining that the terminal has moved away from a source that is playing the broadcast program/movie.

10. The broadcast program/movie identification server of claim 9, further comprising:

a repository that contains names of known programs/movies and associated predefined data that characterizes content of the known programs/movies, and that identifies known media servers from which the known programs/movies can be downloaded by the terminal, wherein the controller is further configured to identify the broadcast program/movie sensed by the terminal by searching the repository to find a match between the characterization data received from the terminal and the predefined data characterizing content of one of the known programs/movies.

11. The broadcast program/movie identification server of claim 10, wherein:

the controller is further configured to identify the broadcast program/movie sensed by the terminal by searching the predefined data in the repository to find a match between an audio recording with the received message of an audio portion of the broadcast program/movie sensed by the terminal and the predefined data characterizing content of one of the known programs/movies.

12. The broadcast program/movie identification server of claim 11, wherein:

the controller is further configured to identify the broadcast program/movie sensed by the terminal by matching a pattern of the recorded audio portion to a pattern of a portion of an audio track of one of the known programs/movies.

13. The broadcast program/movie identification server of claim 10, wherein:

the controller is further configured to identify the broadcast program/movie sensed by the terminal by searching the predefined data in the repository to find a match between a video recording with the received message of a video portion of the broadcast program/movie sensed by the terminal and the predefined data characterizing content of one of the known programs/movies.

14. The broadcast program/movie identification server of claim 10, wherein the controller is further configured to identify the broadcast program/movie sensed by the terminal by at least initially limiting the searching in the repository to programs/movies that are known to be recently broadcasted by TV service providers.

15. The broadcast program/movie identification server of claim 10, wherein the controller is further configured to search the repository to identify an Internet address of a known media server from which the identified program/movie can be downloaded by the terminal, and to transmit the identified Internet address to the terminal.

16. The broadcast program/movie identification server of claim 10, wherein the controller is further configured to identify a user viewed location within the identified program/movie that corresponds to what was sensed by the terminal, and to transmit the user viewed location to the terminal.

17. The broadcast program/movie identification server of claim 16, wherein the identified user viewed location identifies an elapsed completed play time relative to a beginning of the identified program/movie.

18. The broadcast program/movie identification server of claim 16, wherein the controller is further configured to identify the user viewed location in response to a time of day stamp associated with the message and a known play timeline of the identified program/movie.

19. The broadcast program/movie identification server of claim 16, wherein the controller is further configured to identify the user viewed location in response to a location where a match was identified between the characterization data received from the terminal and the predefined data in the repository characterizing content of the identified program/movie.

20. A method comprising:

sensing a broadcast program/movie at a wireless mobile terminal that is playing external to the terminal;

generating characterization data at the terminal that characterizes content of the sensed broadcast program/movie and initiating receipt of the program/movie at the terminal in response to determining that the terminal has moved away from a source that is playing the broadcast program/movie;

transmitting from the terminal a message that includes the characterization data and a request for identification of a media server from which the broadcast program/movie can be received;

identifying, at an identification server, the broadcast program/movie by searching a repository to find a match between the characterization data received from the terminal and predefined data that characterizes content of a plurality of known programs/movies;

identifying, at the identification server, a user viewed location within the identified program/movie that corresponds to what was sensed by the terminal;

identifying, at the identification server, an Internet address of a media server from which the terminal can receive transmission of the identified program/movie;

transmitting a message from the identification server to the terminal that identifies the identified program/movie, the user viewed location within the identified program/movie, and the Internet address of the media server; and responding, at the terminal, to the message received from the identification server by establishing a communication connection to the Internet address of the identified media server and requesting transmission therefrom of the identified program/movie starting from a location corresponding to the user viewed location.

* * * * *